United States Patent
Caleskie et al.

[11] 3,781,789
[45] Dec. 25, 1973

[54] ANTI-HIJACKING AND THEFT CONTROL SYSTEMS FOR MOTOR VEHICLES

[75] Inventors: Vincent J. Caleskie, Duxbury, Mass.; Paul T. Hughes, Dallas, Tex.; Robert Wayne Johnson, Minneapolis, Minn.

[73] Assignee: Protection Devices, Inc., Dallas, Tex.

[22] Filed: July 7, 1972

[21] Appl. No.: 269,519

[52] U.S. Cl. .............. 340/64, 307/10 AT, 180/114
[51] Int. Cl. ............................................ B60r 25/04
[58] Field of Search .......................... 340/63, 64, 65; 180/114; 307/10 AT

[56] References Cited
UNITED STATES PATENTS

| | | | |
|---|---|---|---|
| 3,639,897 | 2/1972 | Teich | 340/64 |
| 3,585,584 | 6/1971 | Behrend | 340/64 |
| 3,665,386 | 5/1972 | Dosch | 180/114 X |
| 3,656,100 | 4/1972 | Beltrami | 340/63 |

Primary Examiner—Alvin H. Waring
Attorney—Arthur M. Sloan

[57] ABSTRACT

An anti-hijacking and theft control system for use on motor vehicles including both gasoline engine and diesel engine types. A manually set non-reversible timer when set acts through a relay to disconnect the ignition or fuel solenoid when either a running board tape switch, a door switch, or other suitable switch are activated, and the motor vehicle will not run until the timer has completed its cycle. When the timer has completed its cycle, the motor vehicle returns to normal operation, and the system is inoperative. The system remains inoperative unless a reset is activated or the ignition key is turned off.

10 Claims, 5 Drawing Figures

ANTI-HIJACKING AND THEFT CONTROL SYSTEMS FOR MOTOR VEHICLES

This invention relates to an anti-hijacking and theft control system for use on motor vehicles of all types including both gasoline engine and diesel engine types.

In the invention a manually set non-reversible timer is set by the driver. The timer acts through a relay to disconnect the ignition or fuel solenoid when a suitable switch such as a running board tape switch or a door switch are activated by someone stepping on the running board or opening the door. When the door switch or running board switch or other suitable switch is activated the motor vehicle will not run until the timer has completed its cycle. Hijackers or thieves will be inclined to abandon their nefarious schemes upon disablement of the motor vehicle, particularly if the hijacking is attempted in daylight or in crowded urban and suburban areas. When the timer has completed its cycle, the motor vehicle returns to normal operation, and the anti-hijacking and theft control system is inoperative until suitable means are activated for resetting a relay.

In recent years truck hijacking and theft has become a severe national problem resulting in more than one billion ($1,000,000,000) dollars in losses in 1971. Both the trucking and insurance industries have become alarmed, and law enforcement agencies appear to be inadequate to cope with the rapidly increasing problem.

Many of the hijackings and thefts occur in heavily populated urban areas in daylight. One commonly utilized modus operandi of the hijackers and thieves is to step on the running board or up to the door of a vehicle stopped for a traffic light and to force the driver to open the door and leave the cab by presenting a weapon to his view. The driver is bound and left in a waiting stolen panel truck while the hijacked vehicle is driven to a preplanned location for unloading. After the unloading the hijacked vehicle is abandoned.

The system of the subject invention operates to disable the vehicle when the hijacker steps on the running board or when the vehicle door is opened. Upon disablement of the vehicle the hijacker and this accomplices will normally be compelled to leave off the attempted hijacking. Since the current average value of hijacked cargo is more than forty thousand dollars ($40,000) per hijacking the savings to the consignors, the consignees, the carriers, the insurors, the shippers, the public as represented by the consumer, etc. will be considerable.

Prior art systems and devices for disabling vehicles have proved too costly, too complex, bulky, unreliable, easy to disarm, and inefficient. The system of the present invention is less costly than prior art devices, simple, compact, reliable, extremely difficult to disarm or bypass, and efficient.

The system of the subject invention includes no means for returning the motor vehicle to normal operation prior to the completion of the timer cycle.

Operational procedure utilizing the system of the subject invention is the trucking industry is as follows: (a) terminal management determines that device will be used; (b) driver is instructed to set the timer and make his run; (c) driver starts the engine and sets the timer; (d) when hijacker steps on the running board or opens the door of the cab, the engine will stop running; (e) the engine cannot be restarted; (f) the truck will be disabled until the timer returns to zero; (g) when the timer returns to zero, the truck can be operated; (h) the anti hijacking control system cannot be used again until reset.

The system of the subject invention may be used with any gasoline engine through the ignition system or with any diesel engine through the fuel solenoid switch.

The system of the subject invention will not function until the timer is in operation. The timer is non-reversible and is actuated by the driver. Stepping on the running board or opening the door will cause the engine to stop, and the engine can not be restarted until the timer returns to zero.

Accordingly it is an object of the subject invention to provide an anti-hijacking and theft control system for motor vehicles which operates to disable the motor vehicle thus discouraging hijackers and giving the driver time in which help may arrive.

Another object of the subject invention is to provide an anti-hijacking and theft control system for motor vehicles which operates to disable the motor vehicle and which can be used with both gasoline and diesel engines.

A further object of the subject invention is to provide an anti-hijacking and theft control system which operates to disable the motor vehicle when the hijacker steps on the running board.

An additional object of the subject invention is to provide an anti-hijacking and theft control system which operates to disable the motor vehicle when the door of the vehicle is opened.

Still another object of the subject invention is to provide an anti-hijacking and theft control system for gasoline engine motor vehicles which disables the vehicle by cutting off the ignition system.

Yet another object of the subject invention is to provide an anti-hijacking and theft control system for diesel engine motor vehicles which disables the vehicle by cutting off the fuel solenoid switch.

Another object of the subject invention is to provide an anti-hijacking and theft control system for motor vehicles which operates to disable the motor vehicle until a manually set non-reversible timer has completed its timing cycle.

A further object of the subject invention is to provide an anti-hijacking and theft control system for motor vehicles which operates to disable the motor vehicle in which the time of disablement is manually pre-set by the driver on a non-reversible timer prior to commencing his run.

Still an object of the subject invention is to provide an improved anti-hijacking and theft control system for motor vehicles which is less costly, simpler, more compact, more reliable, harder to disarm or bypass, and more efficient than prior art devices.

The novel features which are considered as characteristic for the invention are set forth in particular in the appended claims; the invention itself, however, both as ato its construction and its method of operation, together with additional objects and advantages thereof, will be best understood from the following description of specific embodiments when read in connection with the accompanying drawings, in which:

Figure 1:
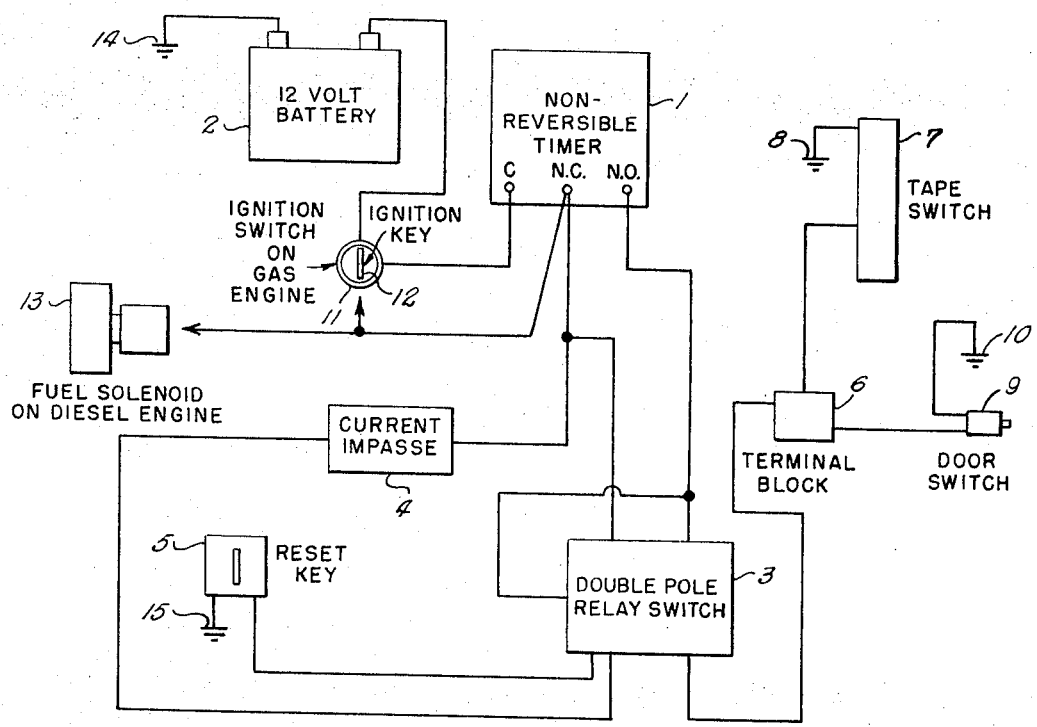
FIG. 1 is a schematic block diagram of one embodiment of the anti-hijacking control system of the subject invention.
Figure 2:
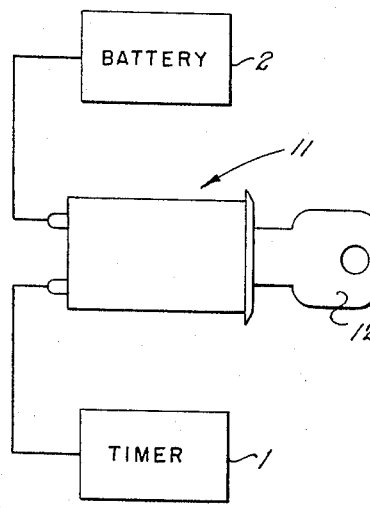
FIG. 2 is a schematic block diagram showing the connections of the ignition switch on a gas engine vehicle to the battery and timer.
Figure 3:
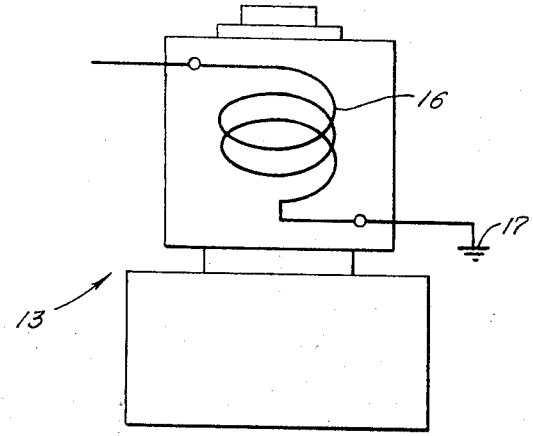
FIG. 3 is a diagram showing the solenoid coil and connection to ground on a solenoid fuel valve for a diesel engine vehicle.

Turning to the invention as embodied in FIGS. 1 through 3, non-reversible timer 1 is shown with Terminal C connected to the current source, namely the positive (+) terminal of the battery 2, when the ignition switch 11 or other suitable power switch is turned on by ignition key 12 or other suitable key. The non-reversible timer 1 terminals also include normally closed terminal (NC) and and normally open terminal (NO). Double pole relay switch 3 is a latching relay switch which operates to open the NC terminal and close the NO terminal on the non-reversible timer 1 when the door switch 9 or tape switch 7 are actuated by opening the door or stepping on the tape switch 7 while there is time on the timer 1.

Door switch 9 and tape switch 7 are connected to the double pole relay switch 3 through the terminal block 6. Tape switch 7 is grounded at 8, and door switch 9 is grounded at 10.

Opening of the NC terminal of the non-reversible timer 1 while there is time on the non-reversible timer 1 shorts out the fuel solenoid valve 13 on a diesel engine or the ignition on a gas engine, as indicated by the arrows directed towards the fuel solenoid valve 13 and ignition switch 11, respectively.

The current impasse 4 may be comprised of diodes or other suitable means to prevent damage to the system from excessive currents.

After the non-reversible timer 1 has run its full cycle and has returned to zero, the vehicle engine can be operated again and the vehicle moved; however the anti-hijacking control system will remain inoperative until reset key or button 5 is actuated.

The negative terminal of the battery 2 is shown going to ground at 14, and the reset key or button 5 is shown grounded at 15.

If the battery 2 is a 12 volt battery as is conventional in many trucks and other motor vehicles, the double pole relay switch 3 should be a 12 volt relay switch with electric reset.

FIG. 3 shows the diesel solenoid fuel valve 13 with solenoid coil 16 grounded at 17.

The system could be made to include flasher units, light series, pilot lights, and or a siren or sirens connected to a suitably poled relay switch to be actuated when there is time on the non-reversible timer and a hijacker steps on the running board or the cab or vehicle door is opened.

Figure 4:
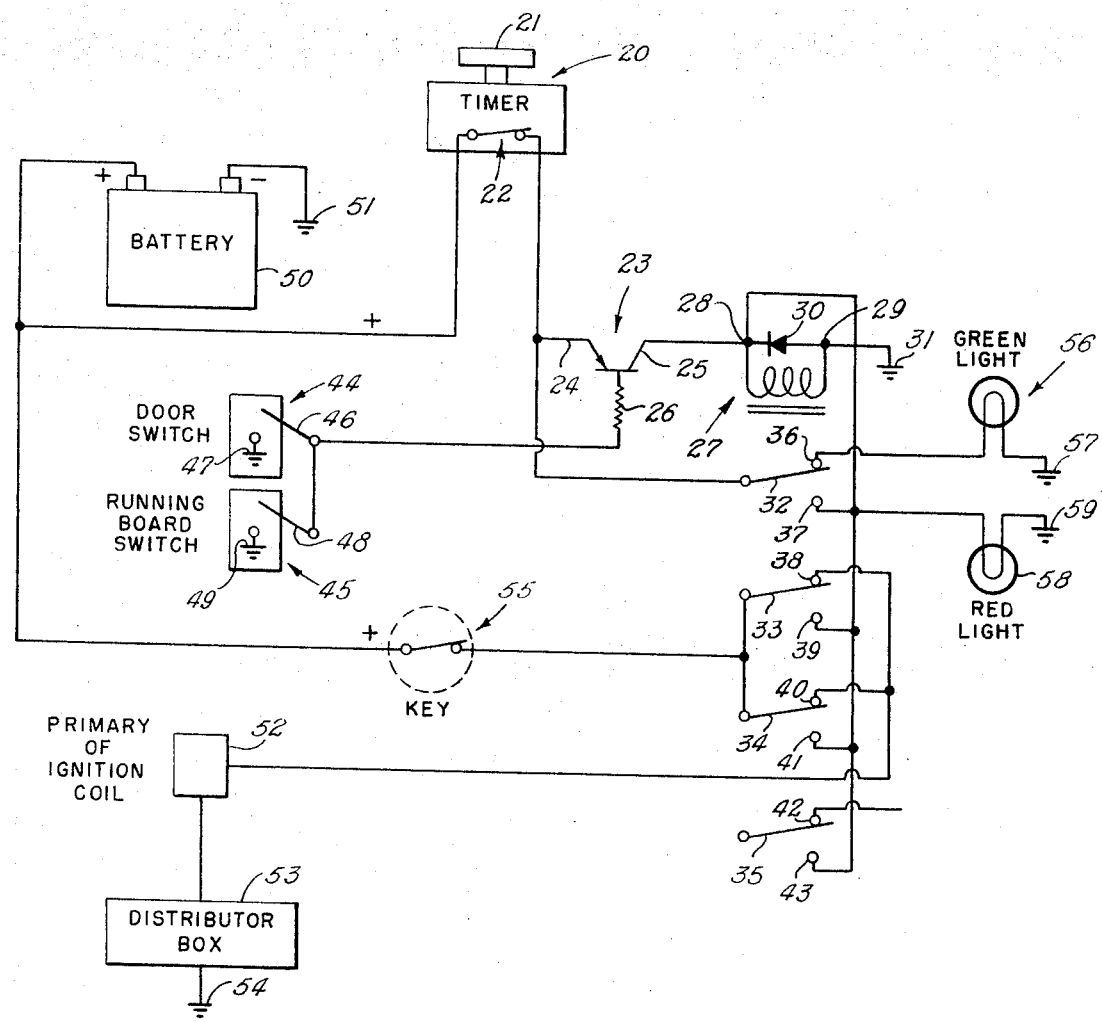
FIG. 4 is a schematic block diagram showing another embodiment of the anti-hijacking control system of the subject invention.

Referring to FIG. 4 another embodiment of the subject invention is shown. Timer 20 has non-reversible setting knob 21. Turning the setting knob 21, i.e., putting time on the timer, closes the normally open timer switch 22. When timer switch 22 is closed, the power to PNP transistor 23 is turned on, and the power to relay switch element 32 is turned on. When the base electrode of the PNP transistor 23 is grounded, current flows to the relay solenoid coil 27 through the transistor 23. The emitter electrode 24 of the transistor 23 receives power through the timer 20. The collector electrode 25 of the transistor 23 delivers power to the solenoid coil 27. Diode 30 is connected to the solenoid coil 27 between the points 28 and 29. The diode 30 protects the transistor 23 from damage from reverse current flow from the solenoid coil 27 when power is not passing through the transistor 23 to the solenoid coil 27. Resistor 26 connected to the base electrode of transistor 23 is a current limiting resistor to prevent oversaturation.

The base electrode of the transistor 23 is grounded by the hijacker's either causing the door of the vehicle to open or standing on the running board switch which is a tape switch extending along the surface of the running board. Upon opening of the vehicle door, the door switch 44 closes with switch element 46 contacting ground 47. Normally the metal chassis of the vehicle is grounded. When the hijacker steps on the running board, the running board switch 45 closes with switch element 48 contacting ground 49.

The anode electrode of diode 30 is connected to ground 31 through connection point 29.

The relay shown in FIG. 4 is a 4 pole double throw relay and may be capable of handling up to 15 Amps. Relays with a 6 Amp. maximum rating have been used.

When the timer 20 is running, i.e., when there is time on the timer 20, but the relay solenoid coil 27 is not energized, i.e., the base electrode of transistor 23 is not grounded and current is not flowing to the relay solenoid coil 27, then the relay switch element 32 is contacting the switch element 36 and the green light 56 which is grounded at 57 is lit, and the relay switch elements 33 and 34 are contacting the switch elements 38 and 40, respectively, so that when the key switch 55 is turned on, power will flow from the positive electrode of the battery 50 to the primary of the ignition coil 52 and the distributor box 53 to ground 54, thus allowing the engine to run. In the case of a diesel engine the connection would be to the diesel fuel solenoid valve rather than to an ignition coil and distributor box.

When the timer 20 is running, i.e., when there is time on the timer 20, and the relay solenoid coil 27 is energized, i.e., the base electrode of transistor 23 is grounded and current is flowing to the relay solenoid coil 27, then the relay switch element 32 is contacting the switch element 37 and the red light 58 which is grounded at 59 is lit, and the relay switch elements 33 and 34 are contacting the switch elements 39 and 41, respectively, so that whether the key switch 55 is turned on or off, no power will flow from the positive electrode of the battery 50 to the primary of the ignition coil 52 and the distributor box 53, and the engine will not run. Likewise in this situation if a diesel fuel solenoid valve such as shown in FIG. 3 was utilized in place of the primary of the ignition coil and distributor box, no power would flow to the diesel fuel solenoid valve and the engine would not run.

In the system of FIG. 4, only the transistor 23 can fire the relay which is a latching relay.

The negative electrode of the battery 50 is shown grounded at 51.

As shown in FIG. 4, switch elements 35, 42, and 43 of the 4 pole double throw latching relay are not being functionally utilized.

When the timer 20 is not set or has run its cycle, the switch 22 will be open, and the green light will not be lit, thus indicating that the anti-hijacking control system is not operative. In this condition there is no current flowing through the relay solenoid coil 27, and switch elements 33 and 34 are contacting switch elements 38 and 40, respectively so that when the key switch 55 is turned on, power will flow from the positive electrode of the battery 50 to the primary of the ignition coil 52 and the distributor box 53, or the diesel fuel solenoid valve, as the case may be, and the engine will run.

Normally the negative electrode of the battery is grounded to the truck or other vehicle body, and the case of the anti-hijacking control device unit is also grounded to the truck or other vehicle body.

Summarizing the operation, the timer 20 is an open circuit until it is turned on or set. When the timer 20 is on, it provides positive (+) power to the transistor 23 and relay switch element 32. Grounding of resistor 26 causes transistor 23 to conduct to latching relay solenoid coil 27 to effect latching. In latched condition the red light 58 will be lit, and switch elements 33 and 34 will contact switch elements 39 and 41, respectively, so that the vehicle engine will not run. The relay will remain in latched condition until the timer 20 has turned off or run its cycle and the ignition key 55 has turned off.

When the green light 56 is lit, this shows that the timer is set or turned on and indicates that the vehicle is protected by the anti-hijacking control system.

When the door is opened or a hijacker steps on the running board, the relay latches and switch element 32 contacts switch element 37 to light the red light 58 which indicates that the vehicle is disabled and inoperative.

Once the relay solenoid coil 27 is fired, the switch elements 33 and 34 are latched to switch elements 39 and 41, and the ignition primary circuit or diesel fuel solenoid valve is opened.

The switch elements 33 and 34 may be rated 5 Amps. each or any suitable rating. If the switch elements 33 and 34 are rated 5 Amps. each, since they are wired in parallel, they will have 10 Amps. capabilities.

If the key switch 55 were left closed after the timer 20 had completed its cycle during which the system had been alarmed by a hijacker, the points would not be harmed, since on completion of a timer cycle during which there has been an alarming, the latching relay will not reset until the key has been turned off, i.e., after the control system has operated to disable a vehicle by latching the relay, the relay will not reset until both the timer and the key have been turned off which keeps the ignition from coming back on and burning the points.

Figure 5:
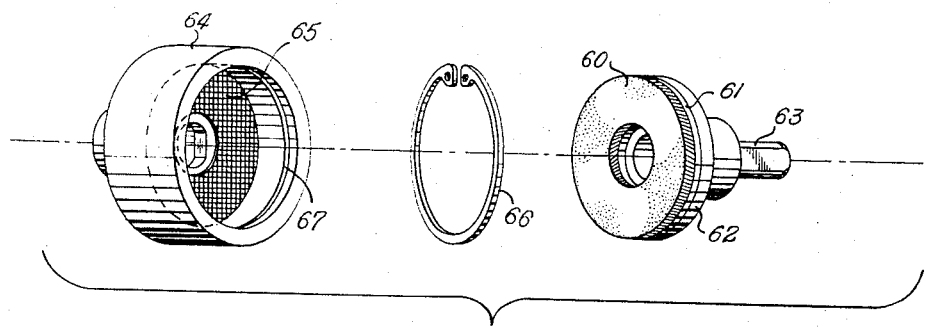
FIG. 5 is an exploded view of a non-reversible clutch device utilized on one type of non-reversible timer that may be used with the subject invention.

FIG. 5 shows a non-reversible clutch device which may be used to effect a non-reversible timer. Drive facing 60 is manufactured by 3M Company, 3M Center, St. Paul, Minnesota 55101 under U.S. Pat. No. 3,436,245, and is sold under the registered trademark FIBRE-TRAN. Drive facing 60 is comprised of oriented nylon fibers which transmit motion and slip as desired for the non-reversible timer. The use and application of the FIBRE-TRAN drive facing with mention of its use in a timer is described in product literature brochures numbers N-PGIS and N-AFTF-I (71.5)J.O. of New Business Ventures Division of 3M Company, 3M Center, St. Paul, Minnesota 55101. The drive facing 60 nylon fibers are oriented in a rotary direction, to act as an overrunning clutch. The drive facing 60 is fixed by adhesive backing 61 to the face of the element 62 which is integral with shaft 63. A suitable knob may be placed over the shaft 63 for manual turning. The drive facing 60 is paired against metal or other suitable screen 65. The screen 65 is fixed in the housing 64 by suitable adhesive. The element 62 is retained in alignment in the housing 64 by split expansion ring 66 which is fitted in depression or groove 67 so that drive facing 60 abuts against screen 65. Any motion of shaft 63 that occurs in the direction of the slanted fibers of the drive facing 60 allows an easy sliding action or slip, but in the opposite direction, against the fibers, the slanted fibers provide a firm hold against the screen 65 and provide a clutch or drive. Hence, with a rotary-orientation counter-clockwise of the slanted fibers of the drive facing 60 in a non-reversible timer application, turning the shaft 63 counterclockwise results in slip having no effect on the timer setting, but turning shaft 63 clockwise provides a positive holding action or drive putting time on the timer.

The control system of the subject invention is easy to install in any convenient place such as under the dashboard of a motor vehicle. As noted, the sensors are normally installed on the boarding steps and on the doors where they will be most effective. On diesel units, a fuel line shut off valve is actuated by the control system, and on gasoline engine an ignition switch is cut off by the control system. When the driver is ready to begin his run, the system is activated by setting a non-reversible timer for the amount of time the run is expected to last, commonly up to two hours. A green light on the panel tells that the system is operating normally and that the sensors are armed. If anyone uses the boarding steps or opens the door, the system senses the hijacking attempt and actuates the fuel line cut off or disables the electrical system, killing the engine and leaving the vehicle stalled until the timer has run its course. A red light indicates that the system has been tripped. At short stops for a meal or nap, the timer may be set for the expected duration of the stop and the system tripped, and the engine will be inoperative for that period of time. The system power is provided by the vehicle battery.

What I claim as my invention and desire to secure by Letters Patent of The United States is:

1. An anti-hijacking control system for connection to a motor vehicle engine including a source of power, manually set non-reversible timer means connected to the power source, actuating means connected to the timer, current blocking means connected between the timer and the actuating means for protecting the system, and at least one sensor means connected to the actuating means so that, when there is time on the timer means and a sensor means is tripped, the engine will be cut off, and the vehicle will be stalled, and in which the actuating means is an electrical relay including relay switch elements and a solenoid coil which throws the relay switch elements to cut off the engine when the solenoid coil is conducting current.

2. An anti-hijacking control system for connection to a motor vehicle engine as described in claim 1 including reset means for resetting the actuating means after the timer means has completed its cycle.

3. An anti-hijacking control system for connection to a motor vehicle engine including a source of power, manually set non-reversible timer means connected to the power source, actuating means connected to the timer means and between the power source and the engine, and at least one sensor means connected between the timer means and the actuating means so that when there is time on the timer means and a sensor means is tripped, the engine will be cut off, and the vehicle will be stalled, and in which the actuating means is an electrical relay including relay switch elements and a solenoid coil which throws the relay switch elements to cut off the engine when the solenoid coil is conducting current.

4. An anti-hijacking control system for connection to a motor vehicle engine as described in claim 3 in which the timer means includes a normally open circuit which is closed when there is time on the timer means and in which the timer means has one end of its normally open circuit connected to the positive electrode of the power source and the other end of its normally open circuit connected to the actuating means.

5. An anti-hijacking control system for connection to a motor vehicle engine as described in claim 4 including a transistor having its base electrode connected to the sensor means, its emitter electrode connected to the actuating means connection Of the timer means, and its collector electrode connected to the actuating means solenoid coil so that when the base electrode of the transistor is grounded by tripping a sensor means when the timer circuit is closed, current will flow from the timer means through the relay solenoid coil to energize the relay switch elements and cut off the vehicle engine and including a resistor connected between the base electrode of the transistor and the sensor means to prevent oversaturation and a diode connected between the ends of the actuating means solenoid coil to protect the transistor and in which the end of the solenoid coil remote from the transistor collector electrode is connected to ground.

6. An anti-hijacking control system for connection to a motor vehicle engine as described in claim 5 including two different indicator lights arranged so that when there is time on the timer means, and a sensor means has not been tripped, one of the relay switch elements connected to the actuating means end of the timer means circuit is connected to one of the indicator lights to light said indicator, and, when there is time on the timer means, and a sensor means is tripped, the actuating means solenoid actuates this relay switch element to disconnect the first indicator light and connect the other indicator light, thus dimming the first indicator light and lighting the second indicator light.

7. An anti-hijacking control system for connection to a motor vehicle engine as described in claim 5 in which the engine is a gasoline engine and in which the actuating means cuts off the engine by shorting out the ignition when current flows from the timer means through the relay solenoid coil to energize the relay switch elements.

8. An anti-hijacking control system for connection to a motor vehicle engine as described in claim 5 in which the engine is a diesel engine and in which the actuating means cuts off the engine by shutting off the fuel line when current flows from the timer means through the relay solenoid coil to energize the relay switch elements and in which the fuel line is shut off by deenergizing a diesel fuel solenoid valve.

9. An anti-hijacking control system for connection to a motor vehicle engine as described in claim 5 including reset means for resetting the actuating means after the timer means has completed its cycle.

10. An anti-hijacking control system for connection to a motor vehicle engine including a source of power, manually set non-reversible timer means connected to the power source, actuating means connected to the timer means and between the power source and the engine, and at least one sensor means connected between the timer means and the actuating means so that when there is time on the timer means and a sensor means is tripped, the engine will be cut off and the vehicle will be stalled, and in which the timer means is made non-reversible by a clutch device which can be manually turned in one direction to put time on the timer means but which will not set back the timer means by turning in the reverse direction.

* * * * *